United States Patent
Otanez et al.

(10) Patent No.: US 8,346,451 B2
(45) Date of Patent: Jan. 1, 2013

(54) REALTIME ESTIMATION OF CLUTCH PISTON POSITION

(75) Inventors: Paul G. Otanez, Troy, MI (US); Shushan Bai, Ann Arbor, MI (US); Vijay A. Neelakantan, Rochester Hills, MI (US); Yue-Ming Chen, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 12/711,038

(22) Filed: Feb. 23, 2010

(65) Prior Publication Data
US 2011/0208396 A1    Aug. 25, 2011

(51) Int. Cl.
*G06F 19/00* (2011.01)
(52) U.S. Cl. .................... 701/67; 192/85.63
(58) Field of Classification Search .......... 701/67, 701/51, 55; 417/404, 97; 192/3.3, 20, 85.63, 192/109 F, 85.39
See application file for complete search history.

(56) References Cited

U.S. PATENT DOCUMENTS

| | | | |
|---|---|---|---|
| 5,893,438 A * | 4/1999 | Hasegawa et al. | 192/3.3 |
| 6,055,475 A * | 4/2000 | Moriyama | 701/56 |
| 6,567,733 B2 * | 5/2003 | Popp et al. | 701/51 |
| 2006/0272919 A1 * | 12/2006 | Kawamoto et al. | 192/88 R |
| 2006/0278493 A1 * | 12/2006 | Ronk et al. | 192/85 R |
| 2007/0137966 A1 * | 6/2007 | Francis et al. | 192/20 |
| 2009/0077957 A1 * | 3/2009 | Noble et al. | 60/376 |
| 2009/0132135 A1 * | 5/2009 | Quinn et al. | 701/55 |
| 2010/0041515 A1 * | 2/2010 | Ohkubo | 477/175 |

* cited by examiner

*Primary Examiner* — Thomas Black
*Assistant Examiner* — Marthe Marc-Coleman

(57) ABSTRACT

The present invention provides an apparatus and method for estimating the realtime position of a clutch piston during the fill cycle using noisy pressure measurements which ensures proper and desired clutch operation. Pressures on both sides of a flow controlling orifice, at the fluid control actuator and the clutch cylinder are measured and these measurements in conjunction with other system parameters such as orifice size, clutch volume and return spring characteristics are used to solve nonlinear dynamic equations (algorithms) which reside in a microprocessor. The microprocessor provides outputs corresponding to an estimate of the current position of the clutch piston, an estimate of the current speed of the piston and an estimate of the current hydraulic pressure. The method can also be utilized to detect clutch wear.

19 Claims, 3 Drawing Sheets

REALTIME ESTIMATION OF CLUTCH PISTON POSITION

FIELD

The present disclosure relates to estimating in realtime a position of a clutch component and more particularly to estimating in realtime the position of a piston of a hydraulically operated clutch.

BACKGROUND

The statements in this section merely provide background information related to the present disclosure and may or may not constitute prior art.

There are numerous ways to classify or categorize automatic transmissions for motor vehicles. Perhaps the most popular and practical way relates to the overall speed ratio change structure. Given this criterion, planetary gear, continuously variable and dual clutch transmissions constitute the three currently most popular types.

Another way to classify automatic transmissions relates to their speed ratio shift configuration. Certain transmissions are classified as clutch-to-clutch transmissions meaning that each shift is accomplished by the release or disengagement of at least one clutch and the activation or engagement of at least one other clutch. This class of automatic transmissions includes most multiple planetary gear and all dual clutch transmissions.

In clutch-to-clutch transmissions, the manner of clutch engagement and disengagement, that is, how quickly engagement (or disengagement) begins after a command, the rate of engagement dE/dt (or disengagement dD/dt), and the time to full engagement (or disengagement), for example, are critical to the overall satisfactory transmission operation and performance which demands consistent and smooth shifts.

In clutch-to-clutch transmissions, to engage a clutch controllably, the piston actuating the clutch is moved to a point at which the full stroke of the clutch is completed. Thus, the clutch volume is completely filled with transmission or hydraulic fluid. After this "fill phase," the torque transmitted by the clutch is then controlled by controlling the clutch fluid pressure.

Prior art clutch control systems rely on collecting indirect information and utilizing it after a shift has been completed to determine the required fill time and time to begin full clutch engagement. This approach is limited by the numerous calibrations that must be utilized to relate the available data to the fill volume and the slow convergence rate of this limited data which delays and adds uncertainty to the computation of the clutch fill time.

As the sophistication of clutch-to-clutch and other transmissions increases and their performance and fuel efficiency goals become even more demanding, controlled, that is, proper and desired engagement and disengagement of clutches in clutch-to-clutch and other transmissions is of increasing importance. The present invention is directed to this goal.

SUMMARY

The present invention provides an apparatus and method for estimating the realtime position of a clutch during the fill cycle using noisy pressure measurements to ensure proper and desired clutch operation. Pressures on both sides of a flow controlling orifice, at the fluid control actuator and the clutch cylinder are measured and these measurements in conjunction with other system parameters such as orifice size, clutch volume and return spring characteristics are used to solve nonlinear dynamic equations (algorithms) which reside in a microprocessor. The microprocessor provides outputs corresponding to an estimate of the current position of the clutch piston, an estimate of the current speed of the piston and an estimate of the current hydraulic pressure. The method can also be utilized to detect clutch wear.

Thus it is an aspect of the present invention to provide an apparatus for estimating the realtime position of a clutch piston during its fill cycle.

It is a further aspect of the present invention to provide a method for estimating the realtime position of a clutch piston during its fill cycle.

It is a still further aspect of the present invention to provide an apparatus for estimating the realtime position of a clutch during the fill cycle using noisy pressure measurements.

It is a still further aspect of the present invention to provide a method for estimating the realtime position of a clutch during the fill cycle using noisy pressure measurements.

It is a still further aspect of the present invention to provide an apparatus for providing a realtime estimate of the current position of the clutch piston, the current speed of the piston and the current hydraulic pressure.

It is a still further aspect of the present invention to provide a method for providing a realtime estimate of the current position of the clutch piston, the current speed of the piston and the current hydraulic pressure.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
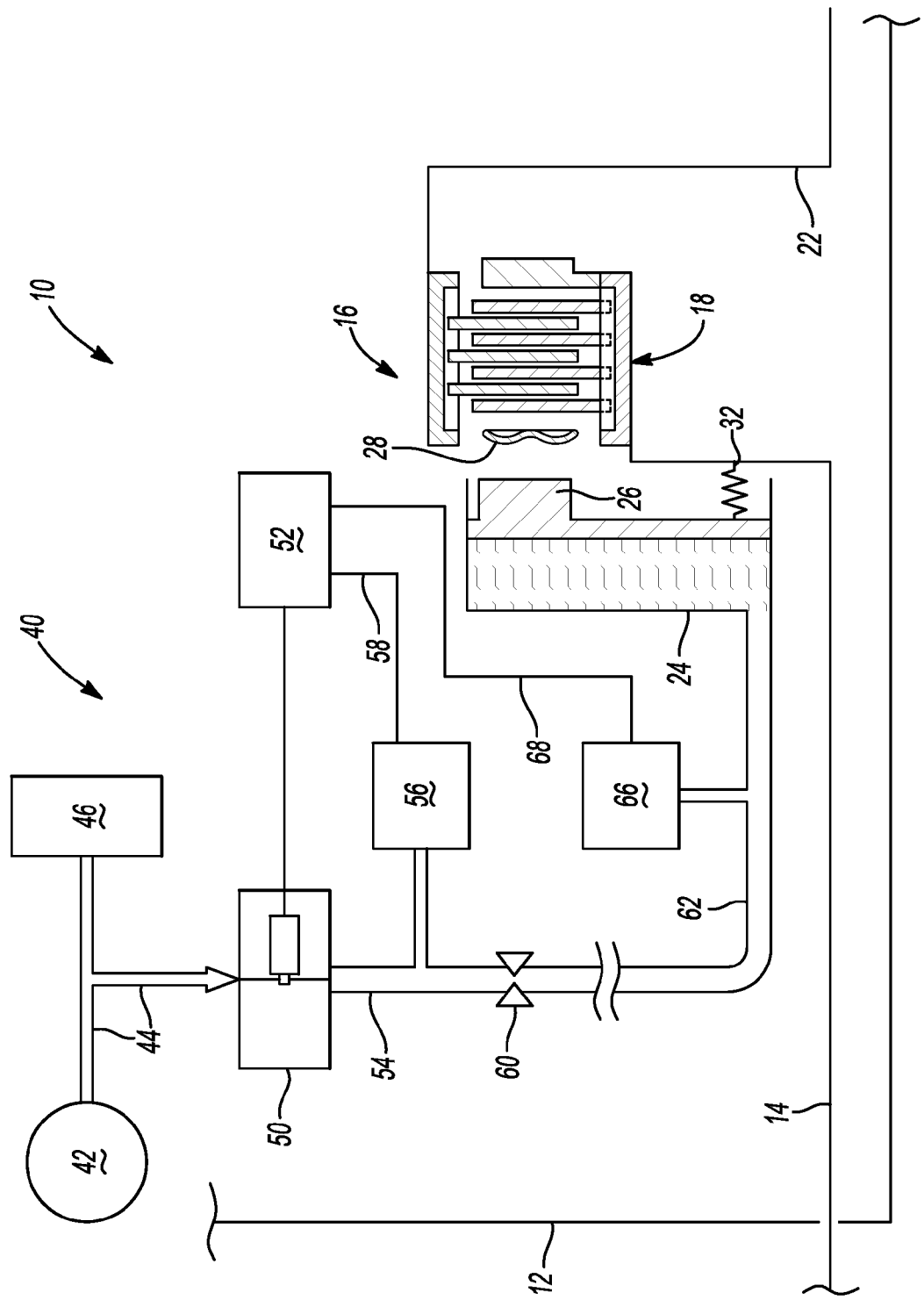
FIG. 1 is a schematic view of a portion of a motor vehicle transmission incorporating the present invention.

With reference to FIG. 1, a portion of an automatic transmission such as a dual clutch transmission is illustrated and generally designated by the reference number 10. The transmission 10 includes a housing 12 having various openings, flanges and other features which receive, locate and support the internal components of the transmission 10. Among those components are an input shaft 14 which is coupled to and drives an input clutch assembly 16 having a friction clutch pack 18 or similar selectively engageable, torque transmitting device. A drive shaft or output member 22 couples and delivers the torque from the friction clutch pack 18 to other components within the transmission 10.

The clutch assembly 16 also includes a typically annular cylinder 24 which receives an axially slidable piston 26 which engages and compresses the friction clutch pack 18. Preferably, a wave plate 28 which provides variable stiffness properties to the friction clutch pack 18 resides between the piston 26 and the friction clutch pack 18. Alternatively, the wave plate 28 may be disposed adjacent the face of the friction clutch pack opposite the piston 26. A return spring 32 provides a restoring or return force to the piston 26 to translate it away from the friction clutch pack 18 when hydraulic pressure within the cylinder 24 is reduced in accordance with conventional design practice.

The transmission 10 also includes a hydraulic fluid (transmission oil) supply and control system 40. The supply and control system 40 includes a hydraulic pump 42 and line pressure control system. The hydraulic pump 42 may be driven directly by an electric motor or driven directly or indirectly from the input shaft 14 of the transmission 10 or the output shaft of a prime mover (not illustrated). The output of the hydraulic pump 42 is provided to a hydraulic supply line 44 which is in fluid communication with an optional accumulator 46. As is well known, the accumulator 46 is a storage device for pressurized hydraulic fluid that stabilizes system pressure and fluid delivery when, for various reasons, fluid consumption exceeds fluid supply. In certain systems and for various reasons, the accumulator 46 may be omitted without sacrificing or compromising proper system operation. Through the supply line 44, hydraulic fluid is provided to a proportional solenoid actuator or control valve 50 such as a variable bleed solenoid valve (VBS) along with a pressure regulating valve, a variable feed solenoid valve (VFS) or other proportioning valve which is controlled by a variable signal such as an analog voltage, or pulse width modulated (PWM) signal from a transmission control module (TCM) or similar controller 52.

The proportional actuator or control valve 50 provides a controlled flow of hydraulic fluid in a supply line 54 to a first actuator pressure sensor 56. The first actuator pressure sensor 56 provides a continuously variable, i.e., proportional or analog, electrical signal or output in a lead or cable 58 to the controller 52. The supply line 54 also communicates with a flow restricting orifice 60. Depending upon instantaneous operating conditions, the orifice 60 limits hydraulic fluid flow and creates a pressure differential, as will be more fully described subsequently. The size of the orifice 60 depends upon many operating parameters such as the pressure and flow characteristics of the hydraulic pump 42 and the accumulator 46 and the pressure, flow and force characteristics of the clutch assembly 16 and may be experimentally or empirically determined. It should be appreciated that hydraulic fluid pressure in the supply line 54 ahead of the orifice 60 may also be read by another or pre-existing sensor (not illustrated) that is a component of the transmission 10 itself or another transmission sub-system. In other words, the first actuator pressure sensor 56 need not be a sensor dedicated to this system but may be a component of another system or sub-system of the transmission 10.

The orifice 60 provides hydraulic fluid to a clutch supply line 62 which communicates with both the cylinder 24 of the clutch assembly 16 and a second clutch pressure sensor 66. The second clutch pressure sensor 66 is preferably located as close as is practical to the clutch cylinder 24 in order to most accurately sense the pressure therein. The second clutch pressure sensor 66 is preferably a device identical to the first pressure sensor 56 and also provides a continuously variable, i.e., proportional or analog, electrical signal or output in a lead or cable 68 to the controller 52.

It will be appreciated that in operation, the transmission control module 52 receives or generates commands that proportionally open or close the actuator or control valve 50. The first actuator pressure sensor 56 senses hydraulic pressure proximate the outlet of the actuator or control valve 50, before the orifice 60 and the second clutch pressure sensor 66 senses hydraulic pressure after the orifice 60, closer to the clutch cylinder 24. This information is provided in the leads or cables 58 and 68 to the transmission control module 52. and is utilized as described below to generate a realtime estimate of the position of the hydraulic piston 26 as it translates within the cylinder 24 and applies force to the friction clutch pack 18.

Figure 2:
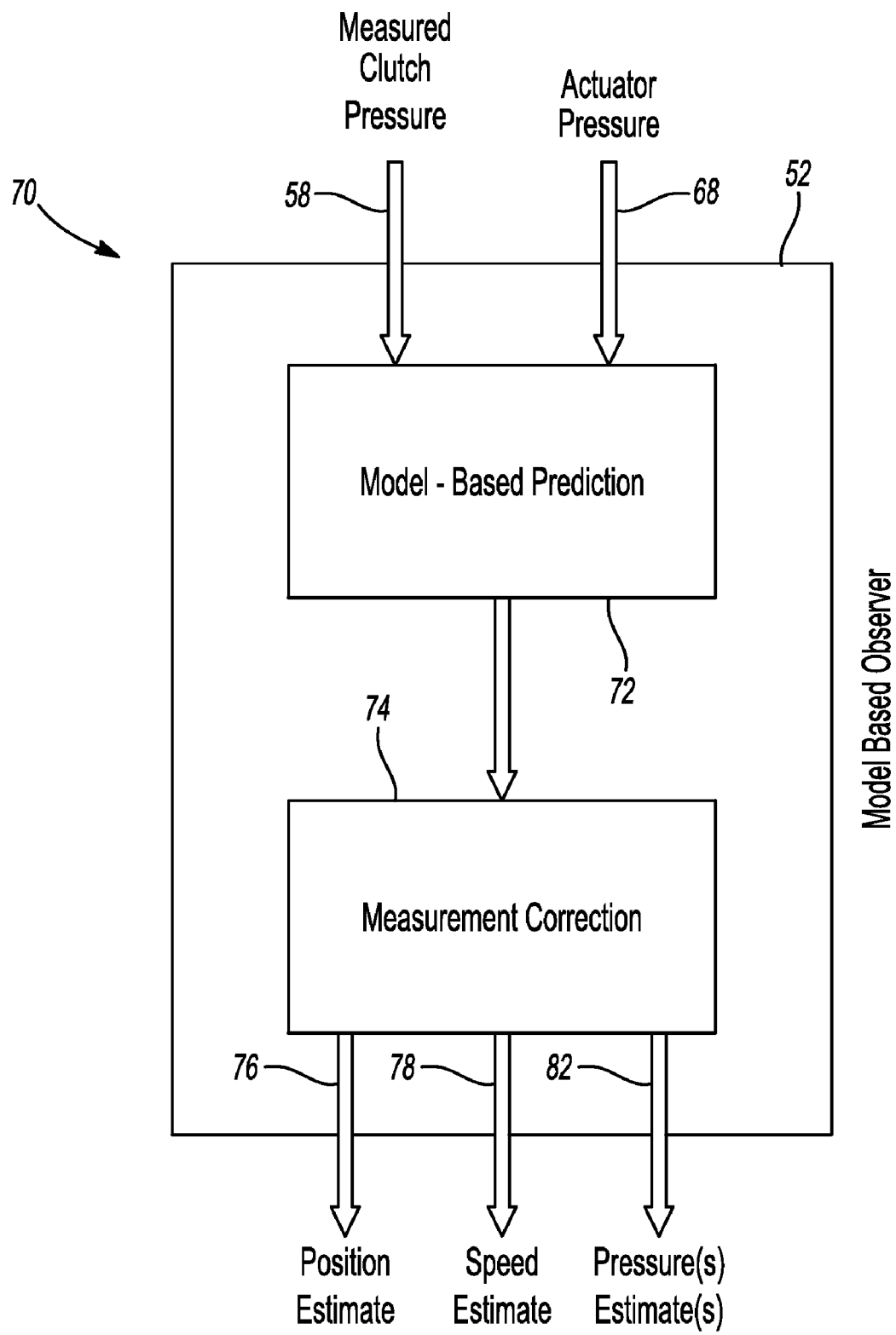
FIG. 2 is a block diagram of a microprocessor embodying the algorithms of the present invention.

Referring now to FIG. 2, a block diagram of the model based observer including the computational software or algorithms which may reside in the transmission control module 52 or a similar device is illustrated and generally designated by the reference number 70. The model based observer 70 receives signals or data from the first sensor 56 in the lead or cable 58 and from the second sensor 66 in the lead or cable 68 which is provided to a model-based prediction processor 72 which contains algorithms which will be described subsequently. The output of the model-based prediction processor 72 is provided to a measurement correction processor 74. The measurement correction processor 74 also contains algorithms which will be described subsequently and provides three data or signal outputs. A first output 76 is or represents an estimate of the present position of the hydraulic piston 26 and thus the extent of engagement of the friction clutch pack 18; the second output 78 is or represents an estimate of the present axial speed of the piston 26 and thus, for example, how soon and how abruptly engagement of the friction clutch pack 18 will occur; and a third output 82 is or represents an estimate of the present pressures at the output of the actuator or control valve 50 and at the input to the hydraulic cylinder 24.

Returning to the model-based prediction processor 72, it includes a force-motion (F=ma) equation which computes the acceleration of the hydraulic piston 26 based upon several system variables and the pressure sensed at the cylinder 24 by the second pressure sensor 66:

$$\ddot{x}_p = \{A_p P_p - D_p \dot{x}_p - F_{drag}(P_p)\tan h(\dot{x}_p/\alpha) - k_p(x_p + x_{po}) - F_{apl}\}/M_p$$

The instantaneous rate of change in the pressure at the hydraulic cylinder 24 per unit time may then be computed with the following equation:

$$\dot{p}_p = \frac{\beta}{(V_o + x_p A_p)} \left\{ \text{sign}(p_{out} - p_p) C_d m_{cfd}^2 \sqrt{\frac{2}{\rho}|p_{out} - p_p|} - \dot{x}_p A_p \right\}$$

This yields $$\dot{X} = f(X, p_{out}, C)$$

where $$X = \begin{pmatrix} x_p \\ \dot{x}_p \\ p_p \end{pmatrix}$$

X represents a vector quantity of the system state variables that include, but are not limited to, position of the piston 26, speed of the piston 26 and pressure at the cylinder 24 and C is equal to a set of parameters.

These computations occurring in the model-based prediction processor 72 are summed with a computation occurring in the measurement correction processor 74 in the following step:

$$[/\$]\$\hat{}\$\$[/\$]\$\hat{}\, A\tilde{P}\dot{\tilde{X}} = f(\tilde{X}, p_{out-m}, C) + g(p_{p_m} - \tilde{p}_p)$$

which can be integrated to provide $\tilde{X}$ which is the estimated value of X, the desired variable, namely the present position of the piston 26, $\tilde{p}$ which is the estimated value of p which is the pressure at the hydraulic cylinder 24, Ppm is the hydraulic pressure measured value from the second sensor 66 at the clutch cylinder 24 and Pout-m is the hydraulic pressure measured value for the first sensor 56 at the output of the actuator or control valve 50. A listing of all the variables which appear in the foregoing equations appears on page 12 of this specification.

Thus by using the measured pressures Ppm and Pout-m, one can estimate the other state variables. It will be appreciated that the choice of the functions $f(\tilde{X}, \text{Pout-m}, C)$ and $g(\text{Ppm} - \tilde{P}p)$ shall be different for different techniques like Kalman filter and sliding mode observer methodologies. For example, $g(\text{Ppm} - \tilde{P}p)$ can be a gain that may be computed using a Kalman filter methodology while a gain multiplied by a signum function may be computed using a sliding mode methodology. The rationale behind adding a function of the error $g(\text{Ppm} - \tilde{P}p)$ is to provide a computational feedback mechanism to correct the overall estimate based on the available clutch pressure measurement Ppm and its estimate Pp. It must be appreciated hence that other estimation methods may be utilized to calculate the states relevant for this application.

Figure 3:
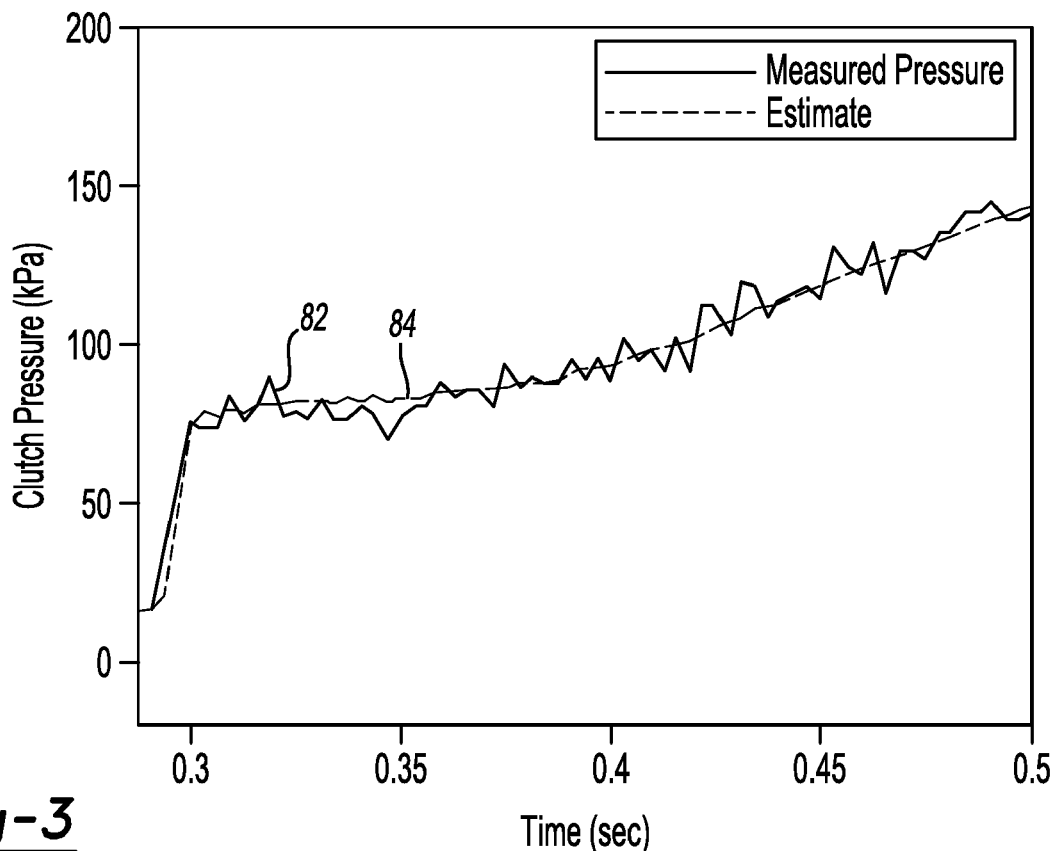
FIG. 3 is a graph presenting measured and estimated clutch pressure with clutch pressure on the vertical (Y) axis and time on the horizontal (X) axis.
Figure 4:
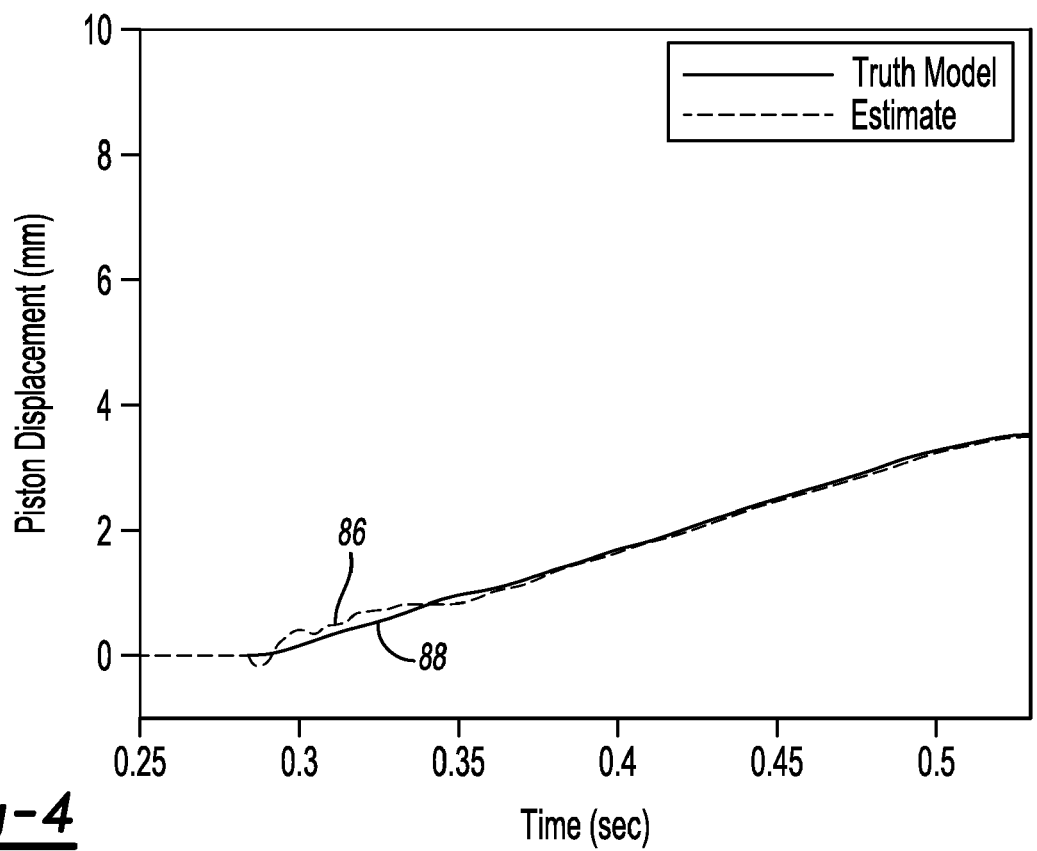
FIG. 4 is a graph presenting estimated and true clutch displacement with clutch piston displacement on the vertical (Y) axis and time on the horizontal (X) axis.

With reference now to FIGS. 3 and 4, it should be understood that one of the primary benefits of the Kalman Filter, its progeny, and their data analysis and computational techniques is the reduction of the effect of noise in a signal. As utilized herein, noise refers to any variation in a signal that can be and is assumed to be a divergence from the actual, true and present value of a measured variable. As FIG. 3 illustrates, the measurement and data analysis techniques of the present invention minimize the effects of noise in the control loop. The plot or line 82 illustrates the raw (unfiltered and unconditioned) data supplied by one of the sensors 56 or 66. It can de appreciated that interpretation of such a data stream may be difficult and that control and transmission operating decisions based upon an instantaneous value may not be optimal. The plot or line 84 represents the pressure value estimated by the above-noted algorithms and utilized to estimate the position of the piston 26. FIG. 4 presents two plots of piston displacement versus time, showing the close agreement between the position of the piston 26 estimated by the above-noted algorithms (86) and the position of the piston 26 confirmed by a truth model (88).

It should be understood that the foregoing description sets forth the best mode contemplated by the inventors for practicing the invention, especially with regard to the incorporation and use of the two pressure sensors 56 and 66 on opposite sides of the orifice 60. However, it should be understood that two alternatives exist which achieve the purpose and goal of the invention but which do not expressly require the first pressure sensor 56. In a first alternative, the first (dedicated) pressure sensor 56 can be replaced with a sensor that is a component of another control or monitoring system (not illustrated). The output of this other, typically pre-existing sensor may then also be provided to and utilized by the controller 52. This, of course, eliminates what might be considered a redundant pressure sensor, thereby saving weight and reducing cost. In a second alternative, the pressure in the supply line 54 is assumed to be the desired (design) system operating pressure such 1000 kPa. Such system design pressures can vary between about 200 kPa and 2200 kPa. Although this assumption has been found to lead to some error in the computation of the piston position estimate and other data, it does provide a viable and operable computational scheme, again without the necessity of incorporating the first pressure sensor 56.

Last of all, since the foregoing apparatus and method provides a realtime estimate of the position of a piston in a friction clutch assembly of a vehicular transmission based on sensed hydraulic pressures in the clutch circuit, it is also possible and should be understood to have utility as well to sense clutch wear, that is, a wearing away of the friction material of the friction clutch pack 18 such that increased piston displacement is necessary to achieve the same level of clutch engagement and torque transfer as in the past.

The description of the invention is merely exemplary in nature and variations that do not depart from the gist of the invention are intended to be within the scope of the invention. Such variations are not to be regarded as a departure from the spirit and scope of the invention.

Listing of Symbols Utilized in Equations $$\begin{pmatrix} x_p \\ \dot{x}_p \\ p_p \end{pmatrix} = \begin{pmatrix} \text{Piston Displacement} \\ \text{Piston Velocity} \\ \text{Pressure at Clutch Chamber} \end{pmatrix}$$

$A_p$=Piston Area
$D_p$=Viscous Drag Coefficient at Piston
$F_{drag}$=Friction Drag on Piston
$\alpha$=Friction Drag Parameter
$k_p$=Spring Constant of Return Spring at Piston
$x_{po}$=Initial Piston Position
$F_{api}$=Force due to Wave Plate at the Clutch
$M_p$=Mass of the Piston
$\beta$=Bulk Modulus of Transmission Fluid
$V_o$=Initial Clutch Chamer Volume
$P_{out}$=Pressure before the orifice between control solenoid valve and clutch
$C_d$=Flow Discharge Coefficient the orifice between control solenoid valve and clutch
$r_{clfd}$=Effective Flow Radius of orifice between control solenoid valve and clutch
p=Mass Density of Transmission Fluid
$h_1$=Piston displacement when wave plate compression starts
$h_1$=Piston displacement when wave plate compression starts
C=set of all parameters listed above that is used to model the clutch

What is claimed is:

1. An apparatus for estimating a present position of a clutch piston comprising, in combination,
   a source of pressurized hydraulic fluid,
   a proportioning control valve having an inlet communicating with said source of hydraulic fluid and an outlet,
   a first pressure sensor disposed to sense hydraulic fluid pressure proximate said outlet and having a first output,
   a flow restricting orifice in fluid communication with said outlet,
   a clutch cylinder in fluid communication with said orifice,
   a second pressure sensor disposed to sense hydraulic fluid pressure proximate said clutch cylinder and having a second output, and a microprocessor having inputs for said first and second outputs and including a model based prediction processor and a measurement correction processor for determining an acceleration of said clutch piston, a change in pressure at said clutch piston and a position of such clutch piston.

2. The apparatus of claim 1 wherein said source of pressurized hydraulic fluid includes a pump.

3. The apparatus of claim 1 wherein said source of pressurized hydraulic fluid includes an electric pump and an accumulator.

4. The apparatus of claim 1 wherein said control valve is a variable bleed (VBS) solenoid valve and a pressure regulator valve.

5. The apparatus of claim 1 wherein said control valve is a variable force (VFS) solenoid valve.

6. The apparatus of claim 1 further including a friction clutch pack acted upon by said piston and having an input member and an output member.

7. The apparatus of claim 1 further including a friction clutch pack acted upon by said piston, a wave plate adjacent said friction clutch pack and a return spring acting on said piston.

8. The apparatus of claim 1 wherein said microprocessor is a component of a transmission control module.

9. An apparatus for determining a position of a hydraulic piston in a clutch assembly comprising, in combination,
a source of pressurized hydraulic fluid,
a control valve having an inlet communicating with said source of hydraulic fluid and an outlet,
means for determining hydraulic fluid pressure at or near said outlet,
a flow restricting orifice in fluid communication with said outlet,
a clutch cylinder in fluid communication with said orifice,
a pressure sensor for sensing hydraulic fluid pressure at or near said clutch cylinder, and
a transmission control module for receiving data from said sensor and said means for determining and including a model based prediction processor and a measurement correction processor for determining an acceleration of said clutch piston, a change in pressure at said clutch piston and a position of such clutch piston.

10. The apparatus of claim 9 wherein said source of pressurized hydraulic fluid includes a pump and an accumulator.

11. The apparatus of claim 9 wherein said control valve is a variable bleed (VBS) solenoid valve and a pressure regulator valve.

12. The apparatus of claim 9 wherein said control valve is a variable force (VFS) solenoid valve.

13. The apparatus of claim 9 further including a friction clutch pack acted upon by said piston and having an input member and an output member.

14. The apparatus of claim 9 further including a friction clutch pack acted upon by said piston, a wave plate adjacent said friction clutch pack and a return spring acting on said piston.

15. The apparatus of claim 9 wherein said means for determining is one of a dedicated pressure sensor, a pressure sensor in another system and a predetermined design value.

16. A method for estimating a position of a hydraulic piston in a clutch assembly comprising, in combination,
providing a source of pressurized hydraulic fluid,
controlling a flow of hydraulic fluid from said source of hydraulic fluid into an outlet line,
determining hydraulic fluid pressure in said outlet line,
restricting a flow of hydraulic fluid in said outlet line through an orifice,
providing said restricted flow of hydraulic fluid to a clutch cylinder;
sensing hydraulic fluid pressure at said clutch cylinder,
utilizing said determined and said sensed hydraulic fluid pressures to determine an acceleration of said clutch piston, a time rate of change in pressure at said clutch piston and a rate of change of position of such clutch piston, and
utilizing said acceleration and rates of change to compute estimates of a position of a clutch piston, a velocity of said piston and fluid pressure in said cylinder.

17. The method of claim 16 further including the step of providing a transmission control module for receiving said sensed hydraulic fluid pressures and controlling said flow of hydraulic fluid.

18. The method of claim 16 wherein said pressure determining step includes assuming an operating design pressure.

19. The method of claim 16 wherein said pressure determining step includes sensing said pressure with a sensor.

* * * * *